United States Patent [19]

Brulé

[11] Patent Number: 4,729,898
[45] Date of Patent: Mar. 8, 1988

[54] HASHED WHITE MEAT BASED FOOD PRODUCT

[76] Inventor: Joseph Brulé, Le Bourg, 44150 Couffe Ancenis, France

[21] Appl. No.: 823,760

[22] Filed: Jan. 29, 1986

[30] Foreign Application Priority Data

Jan. 31, 1985 [FR] France ................. 85 01359
Nov. 14, 1985 [FR] France ................. 85 16843

[51] Int. Cl.⁴ ............................................. A22C 21/00
[52] U.S. Cl. ................................... 426/241; 426/513; 426/523; 426/602; 426/644; 426/646
[58] Field of Search ............. 426/646, 644, 641, 241, 426/513, 523, 589, 602

[56] References Cited

U.S. PATENT DOCUMENTS

| | | | |
|---|---|---|---|
| 3,821,445 | 6/1974 | Okamura et al. | 426/646 |
| 4,058,633 | 11/1977 | Staff et al. | 426/646 |
| 4,133,897 | 1/1979 | Flanyak et al. | 426/646 |
| 4,196,222 | 4/1980 | Cheney | 426/646 |
| 4,218,492 | 8/1980 | Stead et al. | 426/646 |
| 4,450,183 | 5/1984 | Steinberg et al. | 426/646 |

FOREIGN PATENT DOCUMENTS 3247166  8/1984  Fed. Rep. of Germany .

OTHER PUBLICATIONS

"Nouveau Larousse Astronomique", Librairie Larousse, Paris, France, by Prosper Montagne et al., pp. 197, 198 and 458.
Child et al, "Mastering the Art of French Cooking", Alfred A. Knopf, publishers, New York, 1974, pp. 372–377.

Primary Examiner—R. B. Penland
Attorney, Agent, or Firm—Young & Thompson

[57] ABSTRACT

A hashed white meat based food product, such as veal or fowl meat made of a mixture containing by weight more than fifty percent of hashed lean veal or fowl meat with also veal and/or pork fat, spices and condiments, and alcoholic liquids, and according to the invention the fat is introduced into the mixture in the state of a fine emulsion, thereby providing the mixture with the property of retaining the alcoholic liquids, said liquids exuding with the fats only at the moment of the cooking.

2 Claims, No Drawings

HASHED WHITE MEAT BASED FOOD PRODUCT

FIELD OF THE INVENTION

The present invention relates to a hashed white meat based food product, such as veal meat and fowl meat.

BACKGROUND OF PRIOR ART

In the food field are known the so-called "olives of veal" made of rolled veal fillets stuffed with forcemeat. The consumption of olives of veal is relatively small due, on the one hand, to the time needed for their preparation which can only be made on a small scale, the present cadence being at most of 9 kg per hour per worker, with as a consequence a high selling price and, on the other hand, to the preparation and cooking duration which is from one hour and a half to two hours due notably to the necessity of cooking the gravy or sauce by reduction of various products.

Hashed meat based food products are known which are obtained by filling, with various compositions called "mixtures" or "fillings", guts called natural or artificial "smalls". In this class have already been prepared products, notably pork meat based saussages, in the mixtures of which have been incorporated, prior to filling the small, alcoholic liquids and in particular white wines. The liquids thus incorporated in the pork sausages diffuse and evaporate through the gut wall and, during cooking, only a small portion of the aromatic oils of the liquid added to the forcemeat is found in the melted grease exuding out of the gut surrounding the product. Therefore, it seemed impossible to incorporate in the forcemeats and mixtures filling the smalls, during the preparation, liquids which, by diffusion, simultaneously with the fats, through the gut wall, at the moment of the cooking, were likely to provide directly a Madeira wine type sauce such as that which usually accompanies the olives of veal. This impossibility seemed still more certain in the case where the hashed meat based food product is worked up without beeing enclosed inside a gut.

The present invention results from the finding, which is not obvious to those skilled in the art, that the essential stage of the preparation method for obtaining the retention in the mixture of the alcoholic liquids and of the condiment oils, was the hashing and crushing of the fats until a fine emulsion was obtained, the lean meat hashed and mixed to the fat emulsion being a so-called white meat, essentially veal meat, but also possibly fowl meat.

The retention power of alcoholic liquids such as white wines, Madeira wine, alcohols and others by mixing emulsified fats and hashed white meat is such that the mixture can be enclosed inside a poorly permeable gut such as a port small, but the mixture as such can form the new marketed food product after having been simply formed in the shape of blocks or loaves. During cooking, the fats, the alcoholic liquids and the condiment oils exude for providing automatically the formation of the sauce.

Consequently, the object of the present invention is a new hashed white meat based food product containing by weight more than fifty percent of hashed white meat with, moreover, veal and/or pork fats, spices and condiments, and alcoholic liquids, characterized by the fact that the fats are incorporated in the mixed product in the state of a fine emulsion.

According to another feature, the mixed product is used as "mixture" and is conditioned in a pork small or any other other natural or artificial gut presenting an equivalent porosity.

The composition by weight of the mixed product is the following:
Lean white meat: 50 to 70%,
Veal and/or pork fat: 18 to 30%,
Alcoholic liquids: 5 to 15%,
Salt: 2%,
Pepper: 0.2%.
Other condiments: according to flavour required.

The new food product can be cooked quickly during a reduced period of the order of 15 minutes by a simple heating in a frying pan or similar container.

The fat and liquids which exude, together with the condiment oils, provide directly the sauce which usually accompanies the olives of veal.

For an industrial manufacture marketed in large surface stores or similar, the product can be precooked and is usable after a simple reheating. However, it is necessary in this case and due to the exudation of the fats and alcoholic liquids which appears during cooking that the latter be effected in a "bain-marie" or double saucepan or by steam cooking of a product packed under vacuum by thermoforming so that the envelope applies on the product a pressure preventing the exudation of the sauce ingredients, said exudation taking place only when reheating, after the extraction of the product from its wrapper under vacuum.

For the presentation of the product, it is preferable that the latter, made of white meats and fats, has a brown coloring obtained by what is called "caking" in the cooking art. The cooking which, for the hereabove exposed grounds and due to the packing in a thermoformable product, is carried out in a "bain-marie" does not allow obtaining the caking. However, it has been found that it was possible to obtain a caking or cooking of the surface layer of the product according to the invention without exudation of the fats and alcoholic liquids by exposing for a short period to an infrared radiation the product set to shape, with the temperature of its inner mass sufficiently brought down.

The manufacturing method of the cooked food product according to the invention includes, after the hashing and preparation of the mixed product, a forming operation in order to provide portions, a passage in a cold tunnel for blocking the shape, a baking of the surface by exposure to an infrared radiation, a new passage in the cold tunnel for reblocking the product to its shape and composition, a wrapping under vacuum in a thermoformed film, a cooking under vacuum in a "bain-marie" or any other type of steam cooking and a quick cooling down.

A composition of a mixture according to the invention will now be described by way of example:

For obtaining 100 kg of saleable net product, a composition or mixture as follows has been used, containing by weight:

| | |
|---|---|
| Lean veal meat | 67.5 kg |
| Veal and/or pork fats | 22.5 kg |
| Shallots | 3.6 kg |
| Garlic | 0.18 kg |
| Parsley | 0.63 kg |
| Salt | 1.80 kg |
| Pepper | 0.18 kg |
| Nutmeg | 0.18 kg |
| Liqueur brandy | 1.80 kg |
| Madeira wine | 3.60 kg |

| | |
|---|---:|
| -continued | |
| White wine | 7.20 kg |
| that is in total | 109.17 kg |

The preparation of the product has been carried out as follows:

A front portion of a veal is boned and dressed, the fat, the small pieces of lean meat called "cuttings" and the fine lean pieces are sorted out. Then the hashing operation is carried out with a crusher or a knife chopper, also called "cutter".

When a crusher is used, the cuttings, the fats, the shallots, the garlic, the parsley and the nutmeg are hashed with a fine grid until a fine emulsion is obtained, and the fine pieces are hashed with a large grid. The fine emulsion of the products hashed with the fine grid are then mixed in a mixer with salt and pepper, then the liquor brandy and the Madeira wine are added, and the fine pieces are hashed with the large grid. The white wine is added and the mixing is continued until the wine is completely absorbed by the mixture so as to obtain a good flexible thickening.

When hashing with a knife chopper called "cutter", the cuttings and the fat are put in the pan, while adding the garlic, shallots, parsley and nutmeg. After having chopped up small, coarse salt and pepper are added and the chopping is again carried out for three to four turns of the pan until there is obtained a fine emulsion, following which the fine lean pieces are added and the chopper is left rotating for about four turns while adding liquor brandy and Madeira wine. The wine is added while the mixing apparatus is working, until complete absorption of the wine and a good flexible thickening is obtained.

The mixture obtained in one or the other case can be embossed by a push-piece in pork smalls or artificial guts with a similar permeability. It can also be put on the market in the raw state, after a simple forming in blocks or in loaves, or precooked after having been packed under vacuum by thermal forming.

The product presented embossed in a pork small loses, when stored and due to a dessication, about 8.5% of its weight, but the oils, aromas and alcohols are retained in the mixture and freed during cooking with the fat greases.

The composition of the mixture given hereabove by way of example is susceptible to various modifications, notably as regards the nature and percentage of the condiments and alcoholic liquids. It is in particular possible to incorporate therein a cheese of the Gruyere type, or others.

What is claimed is:

1. In a method for making a food product comprising lean white meat, fat and alcoholic liquid, the improvement consisting essentially of the steps of:
   hashing lean white meat and at least one member selected from the group consisting of veal fat and pork fat, to form a fine emulsion;
   adding aqueous alcoholic liquid to said fine emulsion and mixing said emulsion to incorporate said alcoholic liquid therein; and
   shaping said emulsion to form a food product, said product comprising, by weight:
   50–70% lean white meat
   18–30% of said fat
   5–15% of said alcoholic liquid.

2. Method according to claim 1, and:
   passing said formed food product in a cold tunnel;
   exposing said formed food product to infrared radiation to cake the surface thereof;
   passing said irradiated food product in a cold tunnel;
   vacuum-packing said food product in a thermoformed film;
   applying steam to said food product until said product is cooked; and
   cooling said food product.

* * * * *